(12) United States Patent
Lin

(10) Patent No.: US 12,028,508 B2
(45) Date of Patent: Jul. 2, 2024

(54) STEREOSCOPIC THREE-DIMENSIONAL DISPLAY SYSTEM AND MANUFACTURING METHOD THEREOF

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventor: Po-Ching Lin, Miaoli County (TW)

(73) Assignees: INTERFACE TECHNOLOGY (CHENGDU) CO., LTD., Sichuan (CN); INTERFACE OPTOELECTRONICS (SHENZHEN) CO., LTD., Sichuan (CN); GENERAL INTERFACE SOLUTION LIMITED, Guangdong (CN)

( * ) Notice: Subject to any disclaimer, the term of this patent is extended or adjusted under 35 U.S.C. 154(b) by 49 days.

(21) Appl. No.: 17/318,145

(22) Filed: May 12, 2021

(65) Prior Publication Data

US 2022/0337804 A1    Oct. 20, 2022

(30) Foreign Application Priority Data

Apr. 16, 2021  (CN) .......................... 202110411449.7

(51) Int. Cl.
    *H04N 13/305*      (2018.01)
    *G02B 30/27*      (2020.01)
    *H04N 13/31*      (2018.01)

(52) U.S. Cl.
    CPC .......... *H04N 13/305* (2018.05); *G02B 30/27* (2020.01); *H04N 13/31* (2018.05); *H04N 2213/001* (2013.01)

(58) Field of Classification Search
CPC ............... G02B 30/27; G02B 27/0172; G02B 27/0093; G02B 2027/014; G02B 30/30; G02B 2027/0134; H04N 13/305; H04N 13/31; H04N 13/398; H04N 13/383; H04N 13/366; H04N 13/128; H04N 13/239; H04N 13/117; H04N 13/351; H04N 13/32;
(Continued)

(56) References Cited

U.S. PATENT DOCUMENTS

2022/0187612 A1* 6/2022 Aas ...................... H04N 13/122

* cited by examiner

*Primary Examiner* — Farhan Mahmud
(74) *Attorney, Agent, or Firm* — Locke Lord LLP; Tim Tingkang Xia, Esq.

(57) ABSTRACT

A stereoscopic three-dimensional display and manufacturing method thereof includes a three-dimensional display and a depth sensor. The three-dimensional display includes a three-dimensional display module and a parallax optical module that corresponds to a plurality of first depth display portions and a plurality of second depth display portions and a first parallax optical portion and a second parallax optical portion. The depth sensor is electrically connected to the stereoscopic display module, and detects the distance between the user and the stereoscopic display, and selects whether all of the first depth display parts jointly output the first parallax image, or all of the second depth display parts jointly output the second parallax image, so that the user can view the stereoscopic imaging through the first parallax optical unit or the second parallax optical unit at different positions.

8 Claims, 10 Drawing Sheets

(58) Field of Classification Search
CPC ...... H04N 13/341; G06F 3/013; G09G 3/003; G02F 1/29
See application file for complete search history.

STEREOSCOPIC THREE-DIMENSIONAL DISPLAY SYSTEM AND MANUFACTURING METHOD THEREOF

CROSS-REFERENCE TO RELATED APPLICATIONS

This non-provisional application claims priority under 35 U.S.C. § 119(a) on Patent Application No(s). 202110411449.7 filed in China on Apr. 16, 2021, the entire contents of which are hereby incorporated by reference.

BACKGROUND OF THE INVENTION

Field of the Invention

The present invention relates to displays and display systems, in particular to a display or display system that can output parallax images with different viewing angles, and then forms a stereoscopic three-dimensional image at different distances from the human eye to the display or display system.

Description of the Prior Art

Liquid crystal displays (LCD) are dominant display products, and the subsequent successor display technologies organic light-emitting diode (OLED) and quantum dot light-emitting diode (QLED) are also attracting attention, but the development of Micro-LED displays is an objective pursued by many manufacturers.

Micro-LED displays have a wide color gamut, high brightness, low power consumption, excellent stability, long life, wide viewing angle, high dynamic range, high contrast, fast refresh rate, transparency, and other advantages, which make manufacturers value this technology.

According to industry estimates, Micro-LED displays used in automobiles will enter the commercialization stage in the next two to three years. As a result, various manufacturers have exhibited the application and results of related Micro-LED transparent displays.

With the see-through characteristics of transparent displays, the human eye can penetrate the display to see the scene behind it to realize applications that cannot be achieved with traditional displays, such as a physical image and a physical image of the physical scene behind the transparent display to achieve a virtual image fusion application technology for transparent displays. However, because the virtual image displayed on the transparent display is not at the same distance from the physical image, when the human eye views the physical image and the virtual image at the same time, it is easy to cause the eye to see the virtual image clearly, and the physical image of the distant physical scene has problems with blurring. Therefore, it is difficult to have a good user experience with the application of the fusion of physical images and virtual images.

To further explore the reasons for the foregoing problems, the eyeball is controlled by the ciliary muscles to contract or relax the lens. The focusing effect will return clues to the brain to transmit distance information. Therefore, for objects at different distances, the corresponding focusing or accommodation, is different. When the object is at the right accommodation distance, the image of the object will correctly reach the position of the retina and the image can be seen clearly.

Based on the foregoing reasons, the eyes will automatically adjust the focus function for images at different depth positions, resulting in the problem that the virtual image is clearly seen, while the physical image becomes blurred. Therefore, if the problem of fusion of the physical image and the virtual image is to be improved, it is necessary to start with the transparent display, in order to improve the transparent display to solve the problems with the fusion of physical images and virtual images.

SUMMARY OF THE INVENTION

In view of the problems of the prior art, an objective of the present invention is to enable a three-dimensional display to output stereoscopic images that can be observed at different depth positions, and to improve the problem with the fusion of physical images and virtual images.

According to the object of the present invention, a three-dimensional display is provided, including a three-dimensional display module and a parallax optical module. The three-dimensional display module includes a substrate and a plurality of light-emitting elements. Each light-emitting element is arranged on the substrate, and all of the light-emitting elements are arranged on the substrate. The components are staggered and divided into a plurality of first depth display units and a plurality of second depth display units in a checkerboard format. The parallax optical module includes a plurality of first parallax optical components and a plurality of second parallax optical components. The first depth display units collectively output a first parallax image, the second depth display units collectively output a second parallax image, and each of the first parallax optical units is correspondingly disposed on the light output side of one of the first depth display units, so that the first parallax image can be viewed by the user at a first depth position away from the three-dimensional stereoscopic display through the first parallax optical component, and forms a first stereoscopic image in the user's eyes. The light output side of the second depth display unit enables the second parallax image to be viewed by the user at a second depth position away from the three-dimensional stereoscopic display through the second parallax optical unit, and forms a second stereoscopic image in the eyes of the user.

The first parallax image or the second parallax image is each a frame of pictures, and this frame of pictures allows the user's eyes to see the first parallax image and the second parallax image with a depth difference, so that the user can see the first stereo imaging or the second stereo imaging.

Each of the first depth display portion or the second depth display portion displays a part of the pixels of each frame.

Each light-emitting element includes a plurality of red light-emitting elements, green light-emitting elements, and blue light-emitting elements, and each pixel element includes one of the red light-emitting elements, one of the green light-emitting elements, and one of the blue light-emitting elements. Each light-emitting element is a micro light-emitting diode, a quantum dot light-emitting diode, or an organic light-emitting diode.

Also, each first depth display portion and each second depth display portion are arranged in a matrix divided into, for example, nine viewing angle areas, and each viewing angle area has at least two pixels, and each of the pixels of the first depth display portions in the viewing angle areas outputs a left-eye image in the first parallax image, and each of the pixels in the viewing angle areas of the second depth display section outputs a left-eye image in the second parallax image. Each of the pixels in the viewing angle areas in the first depth display sections output a right-eye image in the first parallax image, and the pixels in each viewing angle area of the second depth display sections output a right-eye image in the second parallax image.

Each first parallax optical portion includes a first light-emitting layer and a first optical correction layer, wherein the first light-emitting layer is provided on the light-emitting side of the corresponding first depth display portion, and the thickness of the first light-emitting layer is set in accordance with the light-emitting angle and the first depth position of each light-emitting element of the corresponding first depth display portion. The first optical correction layer is set on the light-emitting side of the first light-emitting layer. The thickness of the first optical correction layer and the surface curvature is set according to the refractive index of the selected material, the left and right eyes of the user projected to the first depth position, and the various viewing angle regions.

Each second parallax optical portion includes a second light-emitting layer and a second optical correction layer, the second light-emitting layer is provided on the light-emitting side of the corresponding second depth display portion. The thickness of the second light-emitting layer is set according to the light-emitting angle and the second depth position of each light-emitting element of the corresponding second depth display part. The second optical correction layer is provided on the light-emitting side of the second light-emitting layer, the thickness of the second optical correction layer and its surface curvature is set according to the refractive index of the selected material, the left and right eyes of the user projected to the second depth position, and the various viewing angle regions.

The parallax optical module can be provided with a leveling layer above the first optical correction layer and the second optical correction layer.

Each first parallax optical portion and each second parallax optical portion respectively adjust the projection direction of each first depth display portion and each viewing angle area with each second depth display portion, so that the viewing angle of each viewing angle area emits light in the direction that is the same as the location.

The projection direction of the light emitted by each light-emitting element in each viewing angle area through each first parallax optical portion and each second parallax optical portion is the projection direction of the viewing angle area at the central position directed to the front, the middle projection direction of the viewing angle area on the left side of one column is toward the left side of the center, the projection direction of the viewing angle area on the right side of the middle column is toward the right side of the center, the projection direction of the viewing angle area on the upper left is toward the upper left direction, and the projection direction of the viewing angle above the center area is toward the middle upward direction, the projection direction of the upper right viewing angle area is toward the upper right direction, the projection direction of the lower left viewing angle area is toward the lower left direction, and the projection direction of the viewing angle area below the center position is toward the middle In the downward direction, and the projection direction of the viewing angle area on the lower right is toward the lower right direction.

The first optical correction layer is provided with a plurality of first microstructure units, the shape of each first microstructure unit is matched to one of the pixels, and the second optical correction layer is provided with a plurality of second microstructure units, and the shape matching of each second microstructure unit corresponds to one of the pixels.

The diagonal size of the first parallax optical part or the second parallax optical part of the first parallax optical part and the second parallax optical part diagonally is derived by the following formula:

$$L = D \times \tan(\alpha/60)$$

Wherein, L is the diagonal size of the first parallax optical part or the second parallax optical part (unit: inches), D is the distance between the human eye and the stereoscopic display (unit: inches), and a is the visual angle of the human eye (unit: inches): angular minutes.

The parallax optical module is provided with a leveling layer above the first optical correction layer and the second optical correction layer, so as to flatten the surface of the three-dimensional display.

The present invention also provides a method for manufacturing a stereoscopic three-dimensional display, which includes the following steps: a plurality of light-emitting elements are arranged on a three-dimensional substrate to become a three-dimensional display module, wherein all the light-emitting elements are staggered in a checkerboard format and divided into a plurality of first depth display portions and a plurality of second depth display portions, a packaging material is disposed on the light-emitting side of the three-dimensional display module, and the packaging material is imprinted with an imprinting mold, then the imprinting mold is removed from the packaging material, so that the packaging material is formed as a parallax optical module, the parallax optical module includes a plurality of first parallax optical parts and a plurality of second parallax optical parts, wherein each of the first parallax optical parts is correspondingly arranged on the light output side relative to one of the first depth display parts, and each of the second parallax optical parts is correspondingly arranged on the light output side opposite to one of the second depth display parts.

All of the first depth display parts jointly output the first parallax image, all of the second depth display parts jointly output the second parallax image, and the first parallax image and the second parallax image are each a frame of pictures, each of the frame images allow the user to see the first parallax image and the second parallax image, and then becomes the first stereoscopic image or the second stereoscopic image in both eyes.

Each first depth display portion or each second depth display portion is equivalent to displaying a part of the pixels of each frame.

Each first depth display portion and each second depth display portion are arranged in a matrix divided into nine viewing angle areas, and each viewing angle area has at least two of the pixels, and each first depth display portion has one pixel in each viewing angle area that outputs the left-eye image in the first parallax image, and one pixel in each viewing angle area of each second depth display unit outputs the right-eye image in the second parallax image. A pixel in each viewing angle area outputs a right-eye image in the first parallax image, and another pixel in each viewing angle area of each second depth display unit outputs a right-eye image in the second parallax image.

The imprinting mold further creates the first light-emitting layer and the first optical correction layer of each first parallax optical portion, the first light-emitting layer is provided on the light-emitting side corresponding to one of the first depth display portions, and the first light-emitting layer is provided on the light-emitting side corresponding to one of the first depth display portions. The thickness of a light-emitting layer is set according to the light-emitting angle and the first depth position of each light-emitting element of the corresponding first depth display portion. The first optical correction layer is set on the light-emitting side of the first light-emitting layer, and the first optical correction The thickness of the layer and its surface curvature are set according to the refractive index of the selected material, the left and right eyes of the user projected to the first depth position, and the various viewing angle regions.

The imprinting mold further creates the second light-emitting layer and the second optical correction layer of each second parallax optical part. The second light-emitting layer is provided on the light-emitting side corresponding to one of the second depth display parts. The thickness of the second light-emitting layer is set according to the light-emitting angle and the second depth position of each light-emitting element of the corresponding second depth display portion. The second optical correction layer is set on the light-emitting side of the second light-emitting layer, and the thickness of the second optical correction layer and its surface curvature are set according to the refractive index of the selected material, the left and right eyes of the user projected to the second depth position, and the various viewing angle regions.

The imprinting mold further makes the first optical correction layer into a plurality of first microstructure units, and the shape of each first microstructure unit corresponds to one of the pixels, and the optical correction layer of the second parallax optical part comprises a plurality of second microstructure units, and the shape of each second microstructure unit is matched to one of the pixels.

The present invention also provides a stereoscopic three-dimensional display system, including a three-dimensional display and a depth sensor. The structure, shape and connection relationship of the three-dimensional display are as described above, and the depth sensor is electrically connected to the three-dimensional display module and detects and uses the depth distance between the user and the stereo display to generate a depth signal. The stereoscopic display receives the depth signal and selects the first depth display unit to output the first parallax image or the second depth display unit to output the second parallax image.

DESCRIPTION OF THE PREFERRED EMBODIMENTS

In order to make the objectives, technical solutions, and advantages of the present invention clearer, the present invention will be further described in detail below in conjunction with the accompanying drawings and embodiments. It should be understood that the specific embodiments described here are only used to explain the present invention, but not used to limit the present invention.

Figure 3:
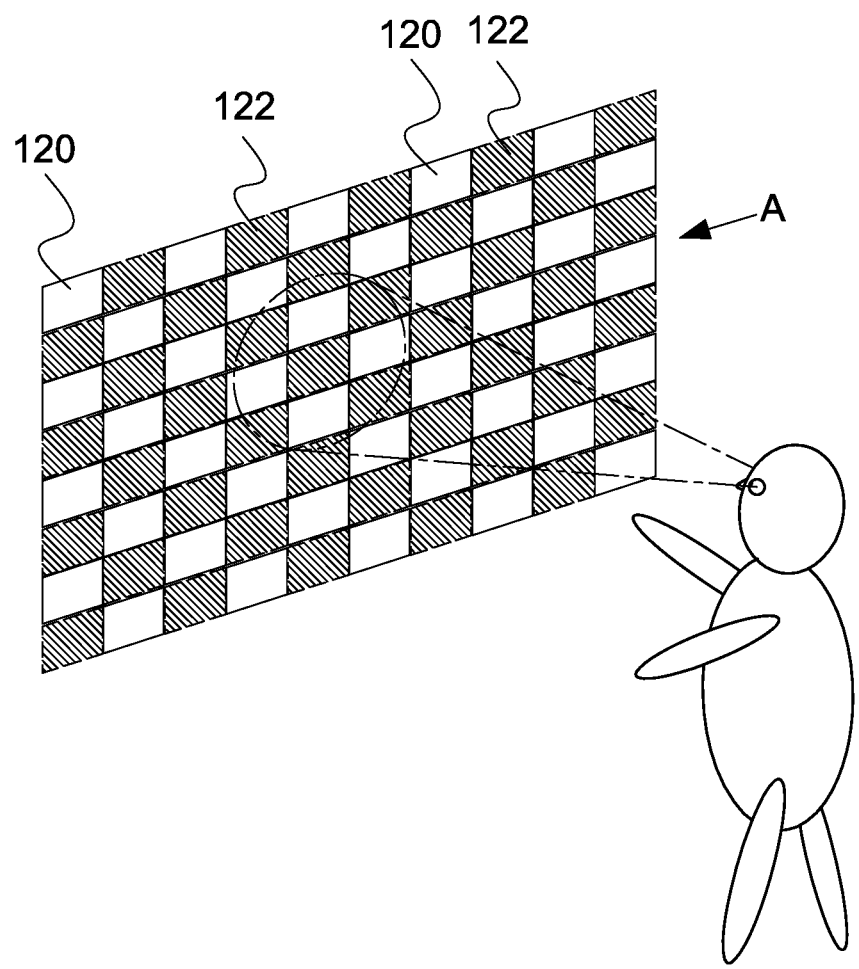
FIG. 3 is a schematic diagram of outputting a second parallax image by the second depth display unit according to the present invention.

The present invention provides a stereoscopic three-dimensional display. Please refer to FIG. 1. The three-dimensional display A includes a three-dimensional display module 1 and a parallax optical module 2. The three-dimensional display module 1 includes a substrate 10 and a plurality of light-emitting elements 12, each light-emitting element 12 is arranged on the substrate 10, and all the light-emitting elements 12 are staggered and divided into a plurality of first depth display portions 120 and a plurality of second depth display portions 122 in a checkerboard format. All the first depth display portions 120 (such as 2) of the first parallax image 3 (shown in FIG. 4) is output together, and all the second depth display units 122 (the portion of the diagonal grid in FIG. 3) collectively output the first parallax image 3 (shown in FIG. 4). Two parallax images 4 (as shown in FIG. 5), of the parallax optical module 2 includes a plurality of first parallax optical parts 20 and a plurality of second parallax optical parts 22, wherein each first parallax optical part 20 is correspondingly disposed opposite to each on the light output side of the depth display section 120, each second parallax optical section 22 is correspondingly disposed on the light output side relative to each second depth display section 122.

Figure 4:
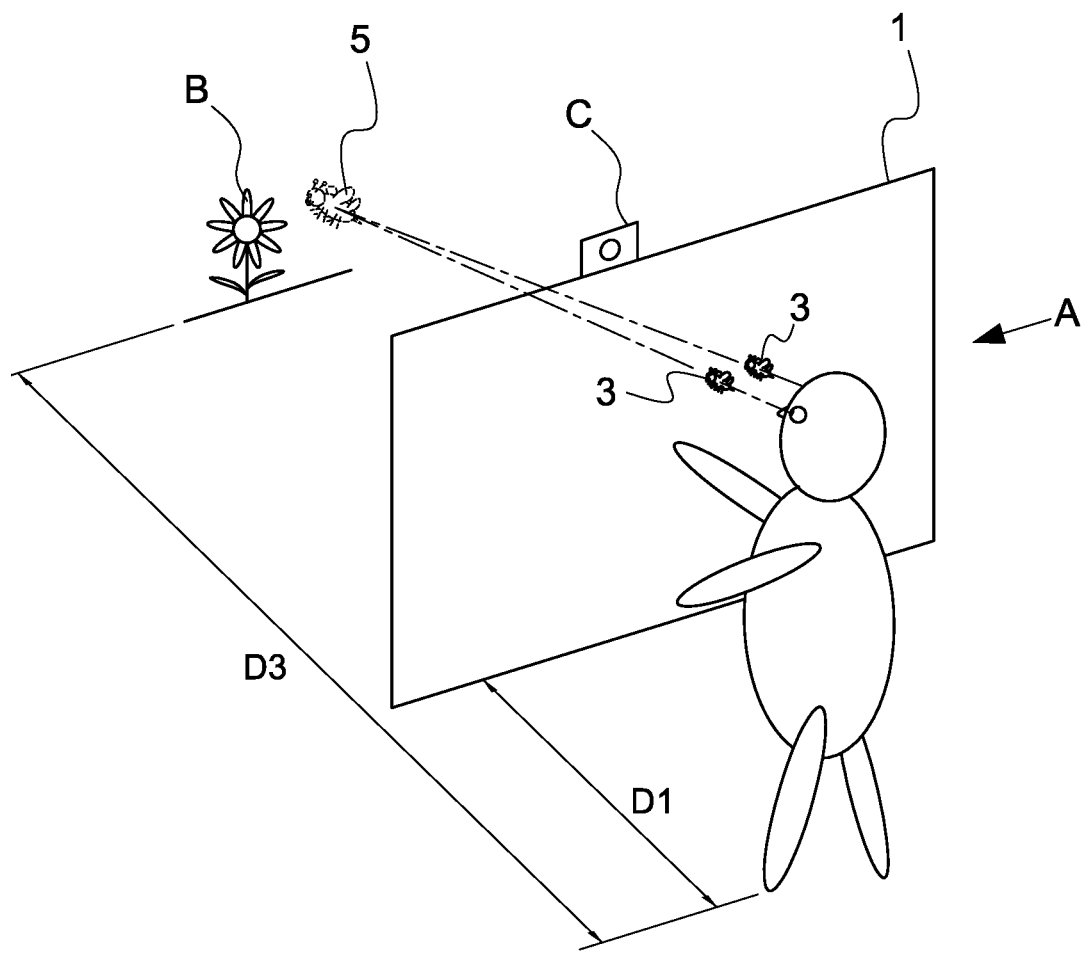
FIG. 4 is a schematic diagram of the first parallax image output by the stereoscopic display of the present invention being viewed by the user.
Figure 5:
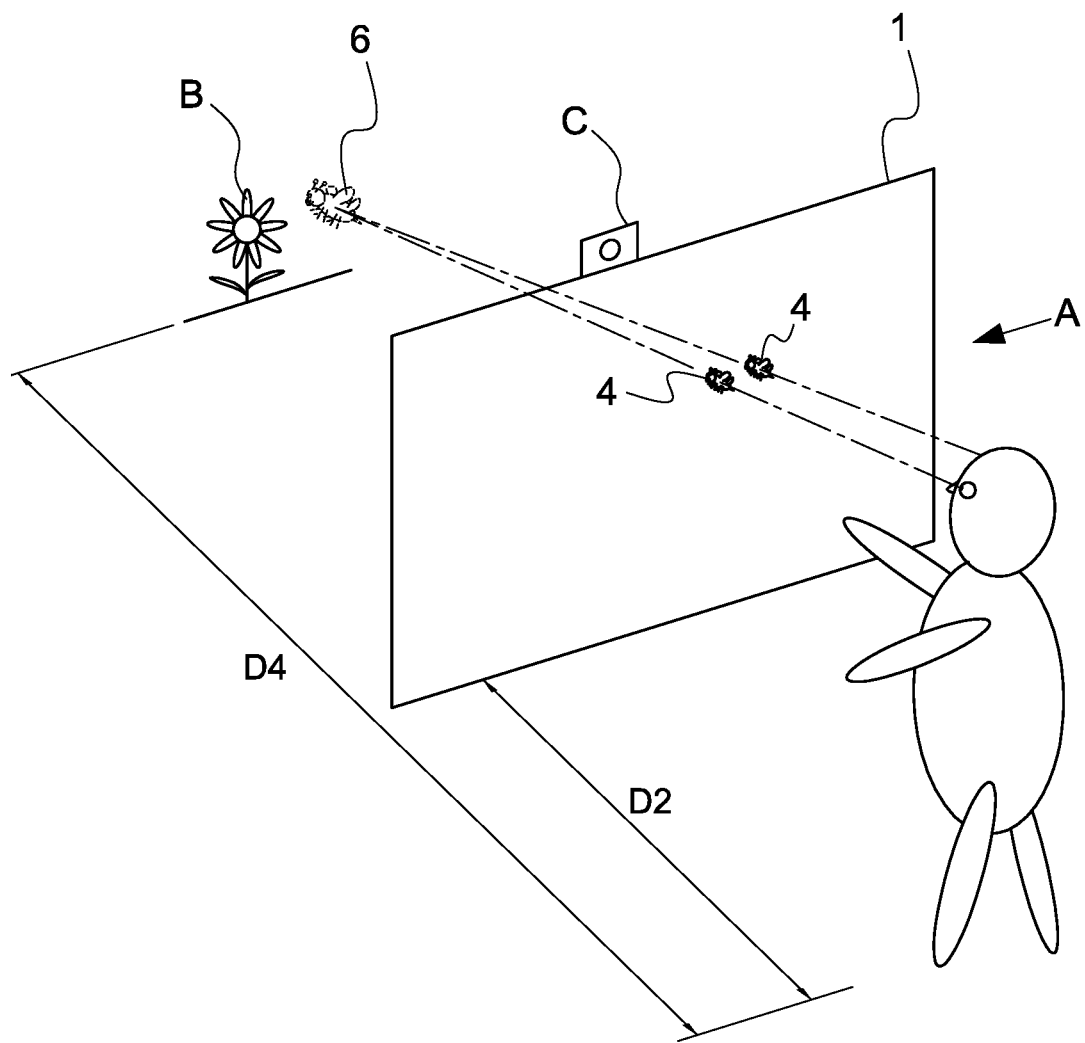
FIG. 5 is a schematic diagram of the stereoscopic display of the present invention outputting a second parallax image viewed by the user.

Please refer to FIG. 4, when the stereoscopic display A outputs the first parallax image 3 (the left bee image and the right bee image in FIG. 4), the user is at the first depth position D1 from the stereoscopic display A and the first parallax image 3 is viewed, and the first parallax image 3 forms a first stereoscopic image 5 in the eyes of the user. Please refer to FIG. 5, when the stereoscopic display A outputs the second parallax image 4 (the left bee image and the right bee image in FIG. 4), the user sees the first image at the second depth position D2 from the stereoscopic display A of two parallax images 4, and the second parallax images 4 form a second stereoscopic image 6 in the eyes of the user. Further, if the substrate 10 is a transparent substrate, while forming the first three-dimensional image 5, the user's eyes actually see through the three-dimensional display A, and the first three-dimensional image 5 and the physical image B of the actual scene behind the display are seen at the first depth of field position D3. As shown in FIG. 5, while the second stereoscopic image 6 is formed in the user's eyes, the user's eyes actually see through the stereoscopic display A, and look like the second stereoscopic image at the second depth of field position D4. Image 6 is an image fused with the physical image B of the actual scene.

Figure 2:
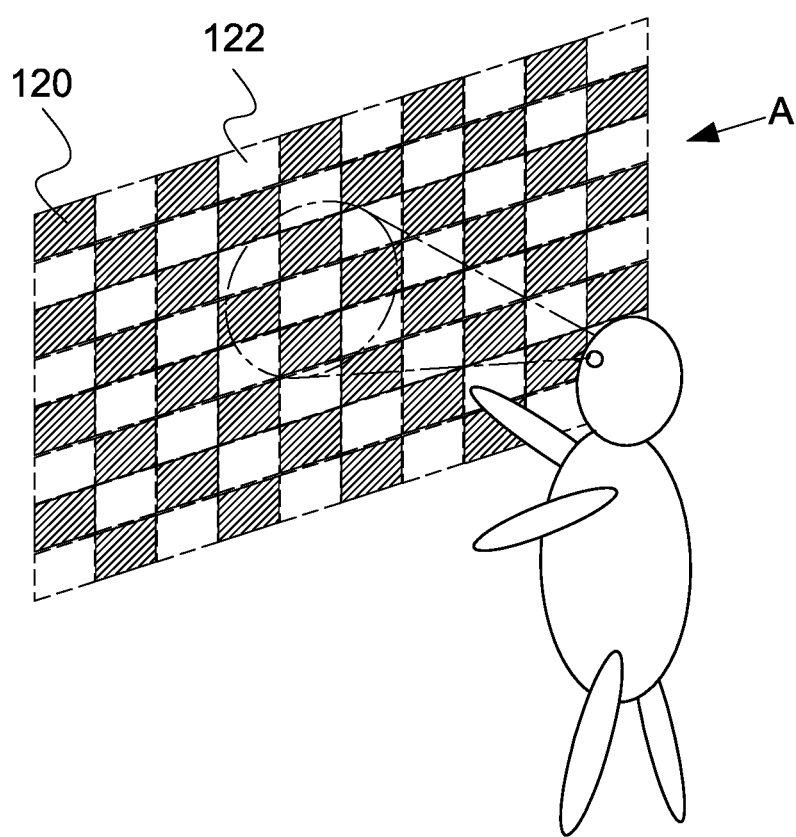
FIG. 2 is a schematic diagram of outputting the first parallax image by the first depth display unit according to the present invention.

In the present invention, the first parallax image 3 or the second parallax image 4 is a frame showing different depths, and this frame allows the user's eyes to see the first parallax image 3 and the second parallax image 4, to become the first stereoscopic imaging 5 or the second stereoscopic imaging 6 in the eyes of the user. Also, referring to FIGS. 2 and 3 again, the first parallax image 3 or the second parallax image 4 is output by all the first depth display parts 120 or all the second depth display parts 122, and the first parallax image 3 and the second parallax image 4 will not be output at the same time, because each of the first depth display portion 120 or the second depth display portion 122 is equivalent to displaying a part of the pixel 70 of each frame, and each first depth display portion 120 or the second depth display portion 122 is so small that the human eye cannot distinguish such a difference, so the first stereoscopic image 5 or the second stereoscopic image 6 seen by the human eye is a completed picture.

In the present invention, each light emitting element 12 may be a three-dimensional micro light emitting diode, a quantum dot light emitting diode, or an organic light emitting diode, so that each first depth display portion 120 and each second depth display portion 122 outputs the first parallax image 3 or the second parallax image 4 from the respective light-emitting diodes.

Figure 6:
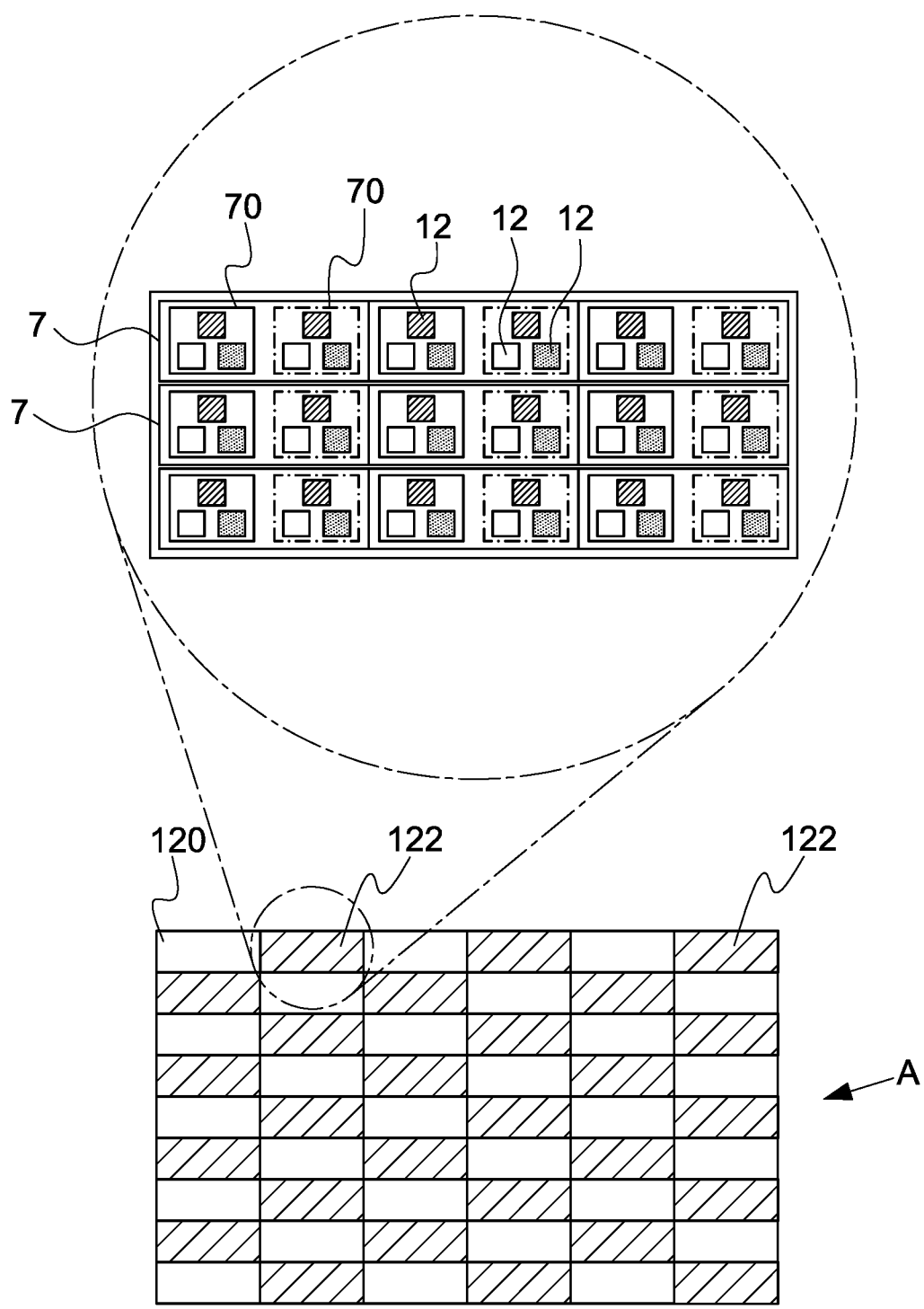
FIG. 6 is a schematic diagram of the viewing angle area of one of the first depth display portion or the second depth display portion of the present invention.

Please refer to FIG. 6. In the present invention each first depth display portion 120 and each second depth display portion 122 are arranged in a matrix divided into nine viewing angle regions 7, and each viewing angle region 7 has among them, at least two pixels 70, one of the pixels 70 in each viewing angle area 7 of each first depth display portion 120 outputs the left-eye image in the first parallax image 3, and one of the pixels 70 in each viewing angle area 7 of each second depth display portion 122 outputs the left-eye image in the second parallax image 4, another pixel 70 in each viewing area 7 of each first depth display unit 120 outputs the right-eye image in the first parallax image 3, and another pixel 70 in each viewing area 7 of each second depth display unit 122 outputs the right-eye image in the second parallax image 4.

In the present invention, each light-emitting element 12 includes a plurality of red light-emitting elements, green light-emitting elements, and blue light-emitting elements, and each pixel 70 includes one red light-emitting element, one green light-emitting element, and one blue light-emitting element, and each light-emitting element 12 is a micro light-emitting diode, a quantum dot light-emitting diode, or an organic light-emitting diode.

Figure 7:
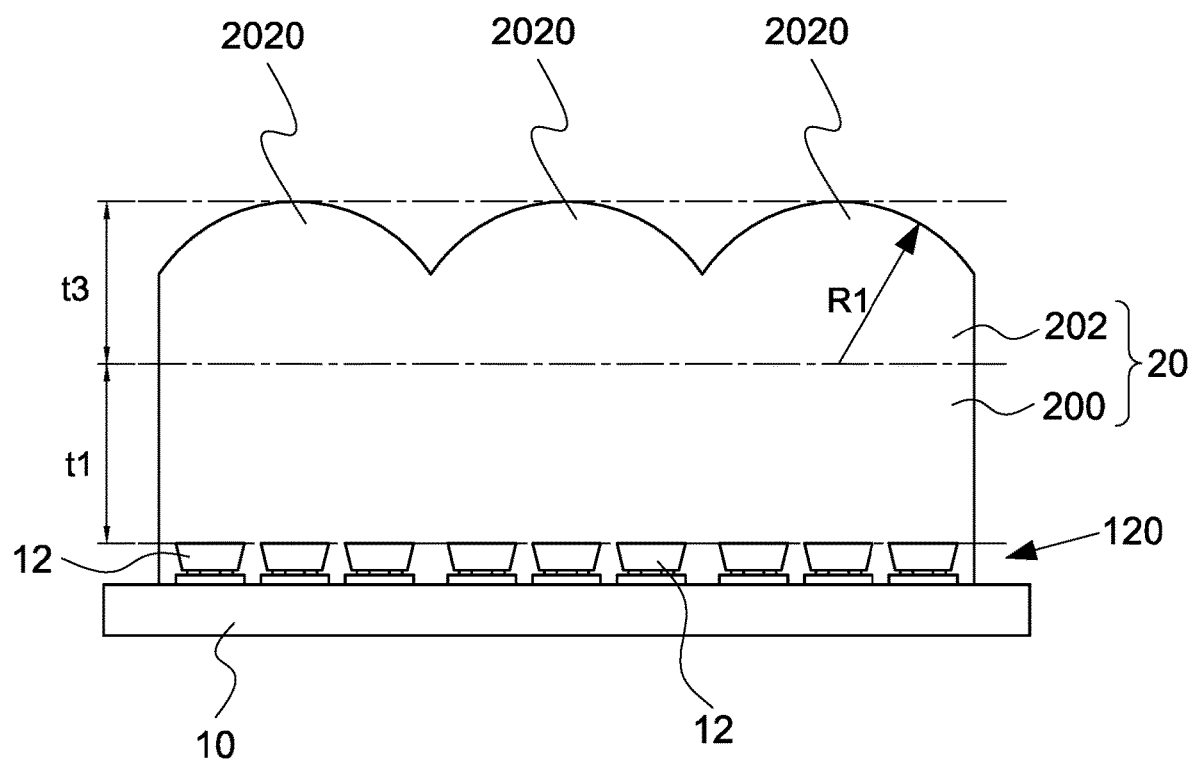
FIG. 7 is a schematic partial cross-sectional view of the first parallax optical part of the present invention.

Referring to FIG. 7, in the present invention each first parallax optical portion 20 includes a first light-emitting layer 200 and a first optical correction layer 202, and each first light-emitting layer 200 is disposed corresponding to each on the light-emitting side of a depth display portion 120, the first optical correction layer 202 is provided on the light-emitting side of the first light-emitting layer 200, wherein the thickness t1 of the first light-emitting layer 200 is based on the light emission of the corresponding to the first depth display portion 120, the light output angle of the element 12, and the first depth position Dl. The thickness t3 of the first optical correction layer 202 and its surface curvature R1 are based on the refractive index of the selected material and the image projected to the user at the first depth position D1, the left eye and the right eye, and each viewing angle area 7 are provided to achieve the purpose of outputting the required first parallax image 3.

Figure 8:
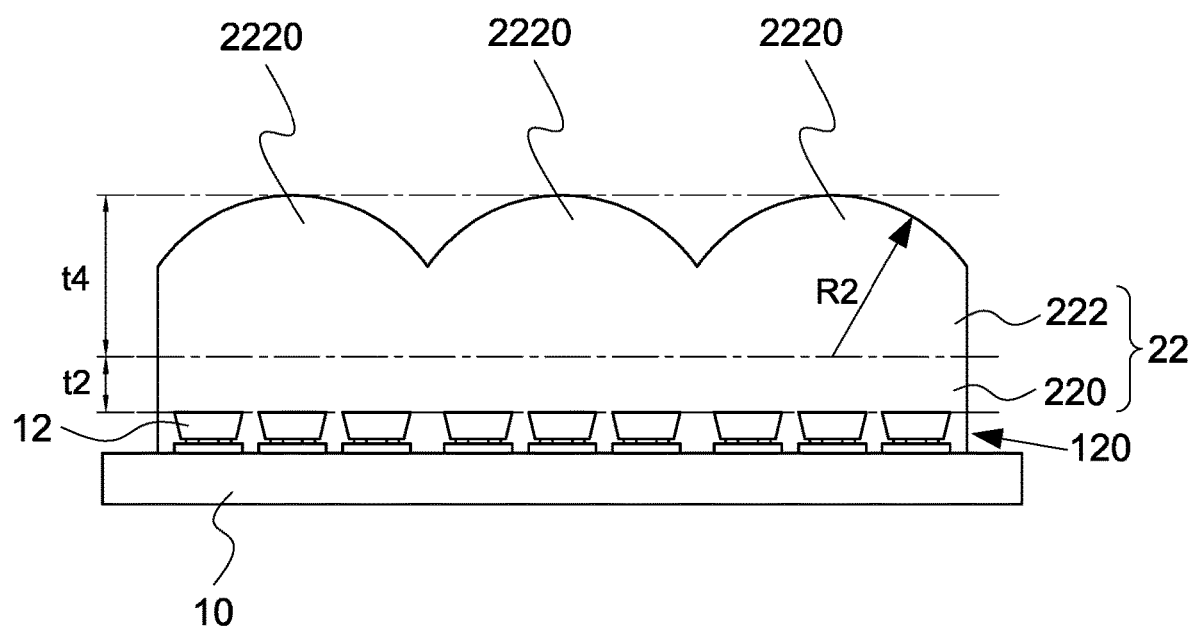
FIG. 8 is a schematic partial cross-sectional view of the second parallax optical part of the present invention.

Please refer to FIG. 8, each second parallax optical portion 22 includes a second light-emitting layer 220 and a second optical correction layer 222, respectively, and the second light-emitting layer 220 is provided on the light-emitting layer corresponding to each second depth display portion 122. Alternatively, each second optical correction layer 222 is provided on the light-emitting side of each second light-emitting layer 220, wherein the thickness t2 of the second light-emitting layer 220 is based on the light output of each light-emitting element 12 of the corresponding second depth display portion 122, the viewing angle, and the second depth position D2. The thickness of the second optical correction layer 222 and its surface curvature R2 are based on the refractive index of the selected material and the projection to the left and right eyes of the user at the second depth position D2, and each viewing area 7, so as to achieve the purpose of outputting the second parallax image 4.

Furthermore, since the first parallax optical section 20 and each second parallax optical section 22 need to be manufactured in accordance with the above conditions, the shape and thickness of the first parallax optical section 20 and each second parallax optical section 22 will be different. Different, generally speaking, in that the height design of the far vision lens is lower than the height design of the near vision lens. Please refer to FIG. 1, assuming that the first parallax optical part 20 is a near vision lens and the second parallax optical part 22 is a far vision lens. Therefore, the thickness of the first parallax optical portion 20 is greater than that of the second parallax optical portion 22. In order to flatten the surface of the stereoscopic display A, the parallax optical module 2 can be provided with a filling layer 8 (see FIG. 1) above the first optical correction layer 202 and the second optical correction layer 222 for filling the height difference between the first optical correction layer 202 and the second optical correction layer 222 is flattened to achieve the purpose of surface flattening.

Figure 9:
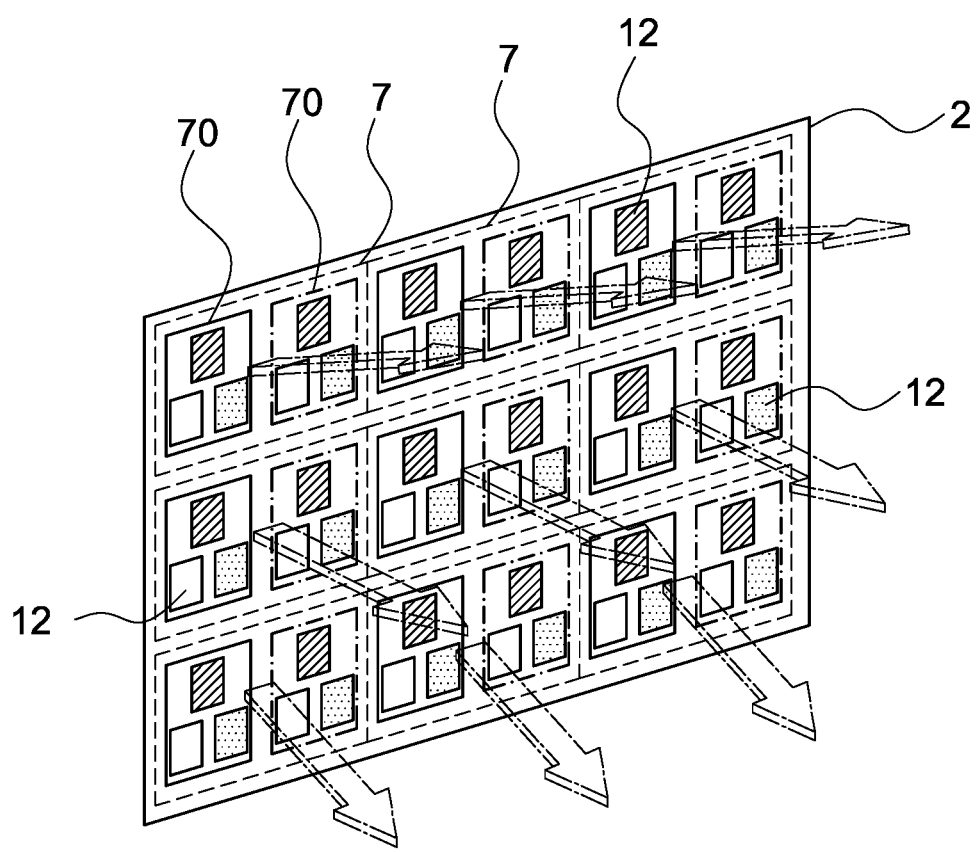
FIG. 9 is a schematic diagram of the projection direction of each viewing angle area of the present invention.

In the present invention, please refer to FIG. 9, each first parallax optical portion 20 and each second parallax optical portion 22 respectively adjusts the viewing angles of each first depth display portion 120 and each second depth display portion 122. The projection direction of the area 7 makes the projection direction of each viewing angle area 7 the same as its orientation. Furthermore, the projection directions of the light emitted by each light-emitting element 12 in each viewing angle area 7 through each first parallax optical portion 20 and each second parallax optical portion 22 are respectively as described, wherein the viewing angle 7 at the central position of the projection direction is toward the front, the projection direction of the viewing angle area 7 on the left side of the middle column is toward the left of the center, and the projection direction of the viewing angle area 7 on the right of the middle column is toward the right of the center, and the projection direction of the viewing angle area 7 on the upper left is toward the upper left direction, the projection direction of the viewing angle area 7 above the central position is toward the middle upward direction, the projection direction of the viewing angle area 7 on the upper right is toward the upper right direction, the projection direction of the viewing angle area 7 on the lower left is toward the lower left direction, the projection direction of the viewing angle area 7 below the center position is toward the middle downward direction, and the projection direction of the lower right viewing angle area 7 is toward the lower right direction. Furthermore, each first parallax optical portion 20 and each second parallax optical portion 22 use the viewing angle regions 7 of the first parallax optical portion 20 and the second parallax optical portion 22 to make the first parallax optical portion 20 and the second parallax optical portion 20 of the second parallax optical portion 22 can provide a larger 3D image field of view (more than 170 degrees) than a traditional see-through display, and can reduce the problem of crosstalk between images and blurring of stereo images due to insufficient viewing angle.

Figure 1:
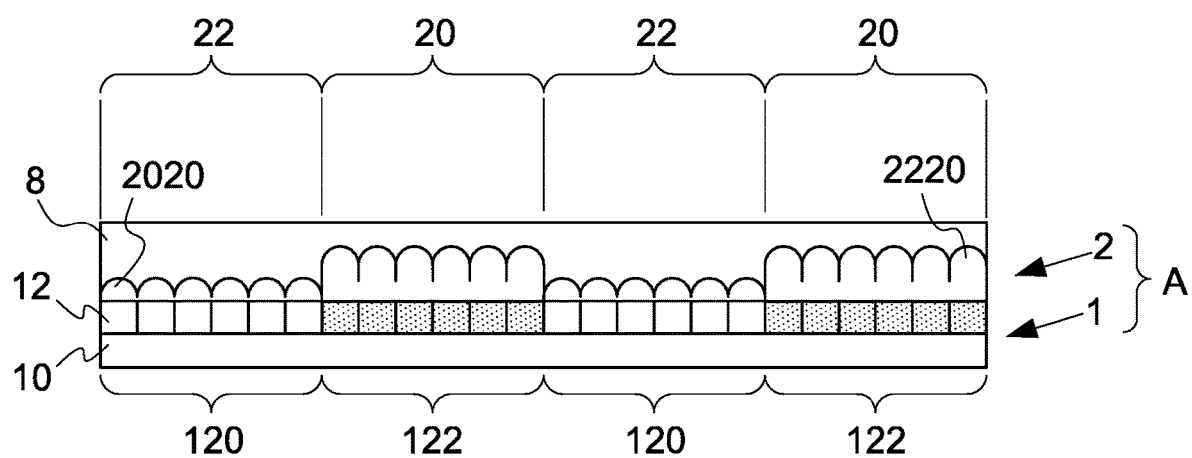
FIG. 1 is a schematic partial cross-sectional view of the stereoscopic three-dimensional display of the present invention.

Furthermore, please refer to FIG. 1, FIG. 7, and FIG. 8. The first optical correction layer 202 is provided with a plurality of first microstructure units 2020, and the shape of each first microstructure unit 2020 corresponds to one of the pixels 70, the second optical correction layer 222 is provided with a plurality of second microstructure units 2220, each of the second microstructure units 2220 corresponds to one of the pixels, wherein each first microstructure unit 2020 and each second microstructure unit 2220 is a lenticular lens. The surface curvature R1 of the first optical correction layer 202 further refers to the surface curvature of each first microstructure unit 2020, and the surface curvature R2 of the second optical correction layer 222 further refers to the surface curvature of each first microstructure unit 2020. Furthermore, the center point position of the surface curvature R1 of each first optical correction layer 202 is the vertical projection position of each first light-emitting layer 200 relative to the center of each pixel 70, and the center point position of the surface curvature R2 of each second optical correction layer 222 is the vertical projection position of each second light-emitting layer 220 relative to the center of each pixel 70.

In the present invention, the diagonal size of the first parallax optical portion 20 and each second parallax optical portion 22 is determined based on the distance between the adjacent first microstructure unit 2020 and the second microstructure unit 2220 when the user views the screen. In terms of design, further, the diagonal size of the first parallax optical portion 20 or each second parallax optical portion 22 is derived as follows:

$$L = D \times \tan(\alpha/60)$$

Where L is the diagonal size of the first parallax optical part 20 or the second parallax optical part 22 (unit: inch), D is the distance between the human eye and the stereoscopic display A (unit: inch), and a is the resolution angle of view (unit: minute of angle) of the human eye and is a unit for measuring plane angles. A complete circle is divided into a central angle of 360 degrees, and every 1 degree is equal to 60 minutes, and every 1 minute is equal to 60 seconds.

Figure 10:
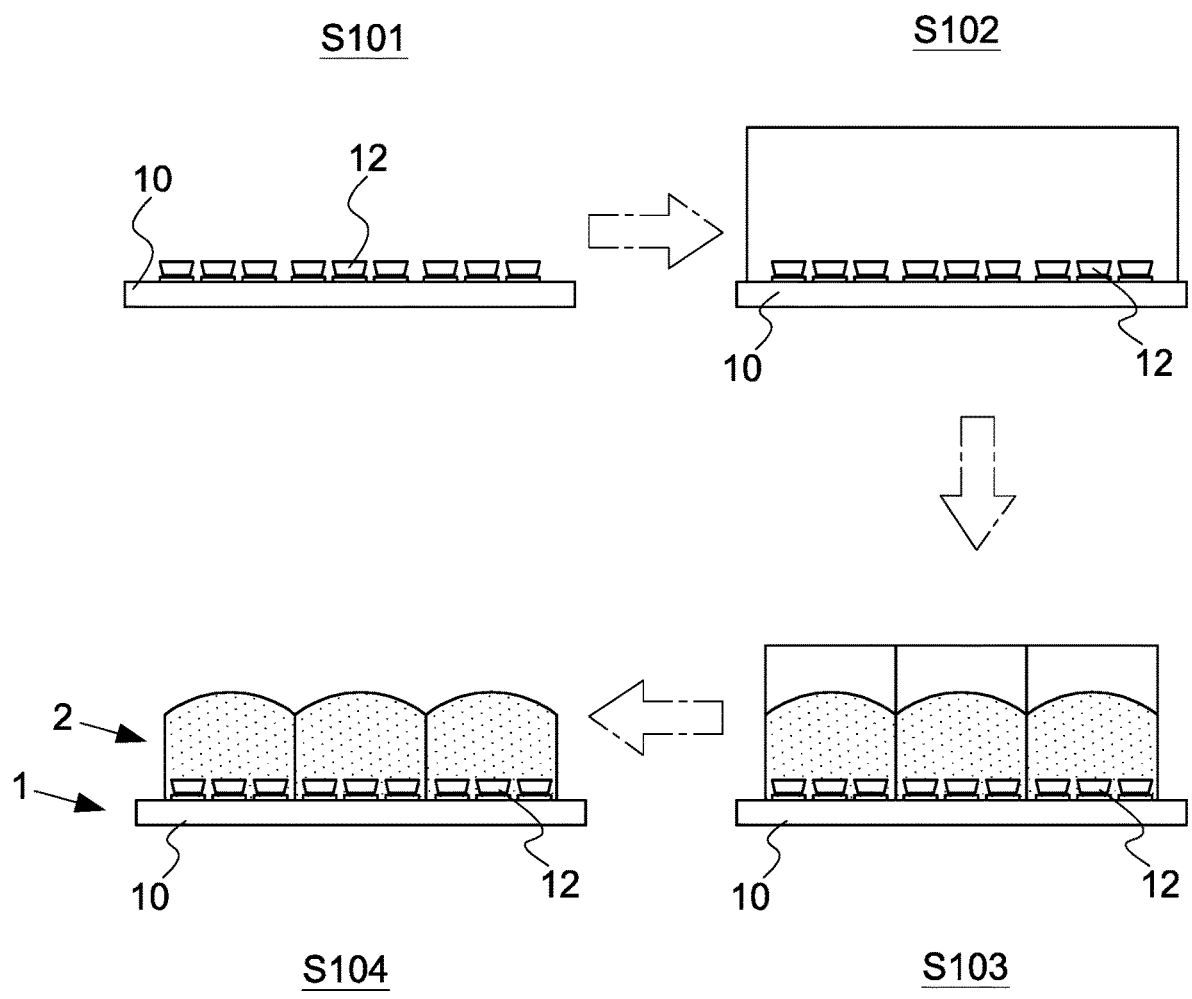
FIG. 10 is a schematic diagram of the manufacturing process of the present invention.

The present invention also provides a method for manufacturing a stereoscopic three-dimensional display. Please refer to FIG. 10, which includes the following steps: (S101) A plurality of light-emitting elements 12 are arranged on a substrate 10 to become a stereoscopic three-dimension display module 1, wherein all the light-emitting elements 12 are staggered in a checkerboard format and divided into a plurality of first depth display parts 120 and a plurality of second depth displays parts 122; (S102) Disposing a packaging material on the light-emitting side of the stereoscopic three-dimension display module 1;
(S103) Imprint the packaging material with an imprint mold;
(S104) The imprinting mold is removed from the packaging material to produce a parallax optical module 2. The parallax optical module 2 includes a plurality of first parallax optical parts 20 and a plurality of second parallax optical parts 22, each of which is a parallax optical unit 20 respectively disposed on the light emitting side opposite to one of the first depth display units 120, and each second parallax optical unit 22 is respectively disposed on the light emitting side opposite to one of the second depth display units 122.

In the present invention, the first parallax image 3 is output by all the first depth display units 120, the second parallax image 4 is output by all the second depth display units 122, and each first depth display unit 120 or second depth display unit 122 displays the pixels 70 of a part of each frame.

Each first depth display portion 120 and each second depth display portion 122 are arranged in a matrix divided into nine viewing angle areas 7, and each viewing angle area 7 has at least two pixels 70, and one of the pixels 70 of each first depth display portion 120 in each viewing area 7 outputs the left-eye image in the first parallax image 3, and one of the pixels 70 in each viewing area 7 of each second depth display section 122 outputs the left-eye image in the second parallax image 4, the other pixel 70 in each viewing area 7 of each first depth display unit 120 outputs the right-eye image in the first parallax image 3, and the other pixel 70 in each viewing area 7 of each second depth display unit 122 outputs the right-eye image in the second parallax image 4.

In the present invention, the imprinting mold further fabricates each first parallax optical portion 20 into the aforementioned first light-emitting layer 200 and the first optical correction layer 202, and each second parallax optical portion 22 is further fabricated into the aforementioned second light-emitting layer 220 and second optical correction layer 222, the first optical correction layer 202 is further made of a plurality of first microstructure units 2020, and the second optical correction layer 222 is further made of a plurality of second microstructure units 2220. The projection directions of the plurality of second microstructure units 2220 and the light-emitting elements 12 in each viewing angle area 7 are also the same as those mentioned above, so they will not be repeated here.

In addition, as mentioned above, the heights of the first optical correction layer 202 and the second optical correction layer 222 are different. Therefore, after step 104 is completed, the filling layer 8 is disposed on the first optical correction layer 202 and the second optical correction layer 222 to make the surface of the stereoscopic display A flattened.

Please refer to FIGS. 4 and 5, the present invention also provides a stereoscopic three-dimensional display system, including the aforementioned three-dimensional display A and a depth sensor C, wherein the three-dimensional display A has the structure shape and connection relationship as described above, and the depth sensor C is electrically connected to the stereoscopic display module 1 and detects the depth distance between the user and the stereoscopic display A to generate a depth signal. The stereoscopic display A receives the depth signal and selects the first depth display unit 120 to output the first parallax image 3, or the second depth display unit 122 to output the second parallax image 4.

For example, when the depth sensor C senses that the depth between the user and the stereoscopic display A does not exceed the first depth position D1, then the stereoscopic display module 1 will display all signals according to the received depth signal. Therefore, the first depth display unit 120 is selected to output the first parallax image 3, and when the depth sensor C senses that the depth between the user and the stereoscopic display A exceeds the first depth position D1, but does not exceed the second depth at position D2, the stereoscopic display module 1 selects the second depth display unit 122 to output the second parallax image 4 according to the received depth signal, but when the depth sensor C senses the depth between the user and the stereoscopic display A exceeds the second depth position D2, the output of the second parallax image 4 can be maintained, or the prompt screen can be selected to output, and the prompt screen prompts the user to advance to the second depth position D2 with graphics and text.

According to the above, the present invention can provide different parallax images for different depth positions, so that the user can receive the first parallax image 3 or the second parallax image 4 at different positions to generate a first stereoscopic image 5 or the second stereoscopic imaging 6, so that the first stereoscopic imaging 5 or the second stereoscopic imaging 6 can be matched with the entity image B at different positions, so that the first stereoscopic imaging 5 or the second stereoscopic imaging 6 can be combined with the entity image in a lifelike manner B, to achieve better visual effects.

The above detailed description is a specific description of possible embodiments of the present invention, but the foregoing embodiments are not intended to limit the scope of the present invention. Any equivalent implementation or modification that does not deviate from the technical spirit of the present invention should be included in the patent scope of this application.

What is claimed is:

1. A stereoscopic three-dimensional display, including:
   a stereoscopic display module, including:
      a substrate; and
      a plurality of light-emitting elements, each of the light-emitting elements is arranged on the substrate, all of the light-emitting elements are staggered in a checkerboard format and divided into a plurality of first depth display parts and a plurality of second depth display parts, all of the first depth display parts jointly output a first parallax image, and all of the second depth display parts jointly output a second parallax image;
   a parallax optical module, including:
      a plurality of first parallax optical parts, each of the first parallax optical parts is respectively disposed on a light emitting side of one of the first depth display parts, so that the first parallax image can be displayed for a user at a distance from the stereoscopic three-dimensional display, and forming a first stereoscopic image in the eyes of the user and viewed from a depth position; and
      a plurality of second parallax optical parts, each of the second parallax optical parts is respectively disposed on a light emitting side of one of the second depth display parts, so that the second parallax image can be displayed for the user at a distance from the stereoscopic three-dimensional display, and forming a second stereoscopic image in the eyes of the user and viewed at a second depth position;
   wherein each of the first depth display portions or each of the second depth display portions is equivalent to displaying a part of the pixels of each frame of a picture;
   wherein each of the first depth display portions and each of the second depth display portions are arranged in a matrix divided into nine viewing angle regions, and each of the viewing angle regions has at least two pixels, one of the pixels in each viewing area of each of the first depth display parts outputs the left-eye image in the first parallax image, and one of the pixels in each viewing area of the second depth display parts outputs the left-eye image in the second parallax image, and the other pixel in each of the viewing angle areas of each of the first depth display parts outputs the right-eye image in the first parallax image, and the other pixel in each of the viewing angle areas of the second depth display parts outputs the right-eye image in the second parallax image;
   wherein the light-emitting elements include a plurality of red light-emitting elements, green light-emitting elements, and blue light-emitting elements, and each pixel includes one red light-emitting element, one green light-emitting element, and one blue light-emitting element;
   wherein each of the first parallax optical units includes:
      a first light-emitting layer provided on the light-emitting side corresponding to one of the first depth display portions, and thickness of the first light-emitting layer is in accordance with the light-emitting angle of each light-emitting element of the corresponding first depth display portion and the first depth position; and
      a first optical correction layer arranged on the light-emitting side of the first light-emitting layer, thickness and surface curvature of the first optical correction layer is in accordance with the refractive index of the selected material, the user's left and right eye at the first depth position and each viewing angle area;
   wherein each of the second parallax optical parts includes:
      a second light-emitting layer provided on the light-emitting side corresponding to each of the second depth display portions, and the thickness of the second light-emitting layer is in accordance with the light-emitting angle and depth position of the second light-emitting element of the corresponding second depth display portion; and
      a second optical correction layer arranged on the light-emitting side of the second light output layer, the thickness of the second optical correction layer and its surface curvature are based on the refractive index of the selected material and the second depth position of the user's left and right eye and each viewing area.

2. The stereoscopic three-dimensional display according to claim 1, wherein each of the first parallax image and the second parallax image is a frame.

3. The stereoscopic three-dimensional display of claim 1, wherein each of the light-emitting elements is a micro light-emitting diode, a quantum dot light-emitting diode, or an organic light-emitting diode.

4. The stereoscopic three-dimensional display according to claim 1, wherein each of the first parallax optical portions and each of the second parallax optical portions adjusts each of the first depth display portions and each of the second depth display portions, and the projection direction of the viewing angle area is such that the projection direction of each viewing angle area is the same as its orientation.

5. The stereoscopic three-dimensional display according to claim 1, wherein the first optical correction layer is provided with a plurality of first microstructure units, and the shape of each of the first microstructure units corresponds to one of the pixels and the second optical correction layer is provided with a plurality of second microstructure units, and the shape of each the second microstructure unit corresponds to one of the pixels.

6. The stereoscopic three-dimensional display according to claim 1, wherein the diagonal size of the first parallax optical part and the second parallax optical part is derived from the following formula:

$$L = D \times \tan(\alpha/60)$$

wherein, L is the diagonal size of the first parallax optical part or the second parallax optical part, D is the distance between the human eye and the stereoscopic three-dimensional display, and α is the distinguishable viewing angle of the human eye.

7. The stereoscopic three-dimensional display according to claim 4, wherein the parallax optical module is provided with a leveling layer above the first optical correction layer and the second optical correction layer.

8. A stereoscopic three-dimensional display system, including:
- a stereoscopic three-dimensional display; and
- a depth sensor electrically connected to the stereo display module;
- wherein the stereoscopic three-dimensional display comprises:
  - a stereoscopic display module, including:
    - a substrate; and
    - a plurality of light-emitting elements, each of the light-emitting elements is arranged on the substrate, all of the light-emitting elements are staggered in a checkerboard format and divided into a plurality of first depth display parts and a plurality of second depth display parts, all of the first depth display parts jointly output a first parallax image, and all of the second depth display parts jointly output a second parallax image;
  - a parallax optical module, including:
    - a plurality of first parallax optical parts, each of the first parallax optical parts is respectively disposed on a light emitting side of one of the first depth display parts, so that the first parallax image can be displayed for a user at a distance from the stereoscopic three-dimensional display, and forming a first stereoscopic image in the eyes of the user and viewed from a depth position; and
    - a plurality of second parallax optical parts, each of the second parallax optical parts is respectively disposed on a light emitting side of one of the second depth display parts, so that the second parallax image can be displayed for the user at a distance from the stereoscopic three-dimensional display, and forming a second stereoscopic image in the eyes of the user and viewed at a second depth position;
- wherein each of the first depth display portions or each of the second depth display portions is equivalent to displaying a part of the pixels of each frame of a picture;
- wherein each of the first depth display portions and each of the second depth display portions are arranged in a matrix divided into nine viewing angle regions, and each of the viewing angle regions has at least two pixels, one of the pixels in each viewing area of each of the first depth display parts outputs the left-eye image in the first parallax image, and one of the pixels in each viewing area of the second depth display parts outputs the left-eye image in the second parallax image, and the other pixel in each of the viewing angle areas of each of the first depth display parts outputs the right-eye image in the first parallax image, and the other pixel in each of the viewing angle areas of the second depth display parts outputs the right-eye image in the second parallax image;
- wherein the light-emitting elements include a plurality of red light-emitting elements, green light-emitting elements, and blue light-emitting elements, and each pixel includes one red light-emitting element, one green light-emitting element, and one blue light-emitting element;
- wherein each of the first parallax optical units includes:
  - a first light-emitting layer provided on the light-emitting side corresponding to one of the first depth display portions, and thickness of the first light-emitting layer is in accordance with the light-emitting angle of each light-emitting element of the corresponding first depth display portion and the first depth position; and
  - a first optical correction layer arranged on the light-emitting side of the first light-emitting layer, thickness and surface curvature of the first optical correction layer is in accordance with the refractive index of the selected material, the user's left and right eye at the first depth position and each viewing angle area;
- wherein each of the second parallax optical parts includes:
  - a second light-emitting layer provided on the light-emitting side corresponding to each of the second depth display portions, and the thickness of the second light-emitting layer is in accordance with the light-emitting angle and depth position of the second light-emitting element of the corresponding second depth display portion; and
  - a second optical correction layer arranged on the light-emitting side of the second light output layer, the thickness of the second optical correction layer and its surface curvature are based on the refractive index of the selected material and the second depth position of the user's left and right eye and each viewing area;
- wherein the depth sensor detects the depth distance between the user and the stereoscopic three-dimensional display to generate a depth signal, and the stereoscopic three-dimensional display receives the depth signal and selects the first depth display unit to output the first parallax image, or the second depth display unit to output the second parallax image.

* * * * *